United States Patent [19]
Tanaka

[11] 3,947,627
[45] Mar. 30, 1976

[54] FACSIMILE SYSTEM

[75] Inventor: Yutaka Tanaka, Kadoma, Japan

[73] Assignee: Matsushita Electric Industrial Company, Limited, Japan

[22] Filed: Oct. 26, 1973

[21] Appl. No.: 409,803

[30] Foreign Application Priority Data

| | | |
|---|---|---|
| Oct. 30, 1972 | Japan | 47-109173 |
| Nov. 2, 1972 | Japan | 47-110108 |
| Nov. 2, 1972 | Japan | 47-110109 |
| Nov. 4, 1972 | Japan | 47-111052 |
| Nov. 4, 1972 | Japan | 47-111053 |
| Nov. 4, 1972 | Japan | 47-111054 |
| Nov. 4, 1972 | Japan | 47-111055 |
| Dec. 6, 1972 | Japan | 47-122728 |
| Nov. 4, 1972 | Japan | 47-111054 |

[52] U.S. Cl. .............. 178/7.1; 178/7.6; 178/DIG. 3
[51] Int. Cl.² ........................................... H04N 1/12
[58] Field of Search .............. 178/7.1, 7.2, 7.6, 7.7, 178/DIG. 3; 357/45

[56] References Cited
UNITED STATES PATENTS

| | | | |
|---|---|---|---|
| 3,383,461 | 5/1968 | Dryden | 178/DIG. 3 |
| 3,632,867 | 1/1972 | Markow | 178/DIG. 3 |
| 3,814,846 | 6/1974 | Snow | 178/7.1 |

*Primary Examiner*—Howard W. Britton
*Attorney, Agent, or Firm*—Robert E. Burns; Emmanuel J. Lobato; Bruce L. Adams

[57] ABSTRACT

A two-valued image is scanned repeatedly along a single line path at a predetermined constant rate and gated out when a transmitter is ready for transmission. A plurality of memory devices are used cyclically for storing an image signal of successive lines. The signal is gated out for processing and then transmitted. In one aspect of the invention, two-valued image is scanned on a two-line-at-a-time basis to produce first and second discrete sampled signals which are combined one-by-one to form four combinations of discrete signals. The combinations are formed into a sequence of combination runs. The kinds of combinations and the length of combination runs are respectively encoded into binary codes for transmission.

3 Claims, 17 Drawing Figures

FACSIMILE SYSTEM

The present invention relates generally to facsimile systems, and in particular to an apparatus and method for achieving bandwidth compression using an array of solid-stage photosensors driven by a pair of complementary square wave clocks and a start signal.

In one aspect of the present invention, an array of photodiodes is scanned repeatedly along a single line path to produce a sampled image signal which is gated out onto a transmission line only when a transmitter is ready for transmission.

In another aspect of the present invention, bandwidth compression is achieved by scanning adjacent two lines simultaneously discretely to produce discrete sampled signals which are combined to form combinations of white and black signal elements. These combinations are encoded into a first binary code to represent the kind of combinations. The combinations of discrete signal elements are formed into a sequence of combination runs and the length of each combination run is encoded into a second binary code. The first and second binary codes are combined to constitute one run length and transmitted to a receiver station.

An object of the present invention is to provide a method for reducing transmission time.

Another object of the present invention is to provide a method for efficiently scanning adjacent lines of a two-valued image and forming combinations of sampled signals.

The present invention will be better understood from the following description taken in conjunction with the accompanying drawings, in which:

FIG. 2 is a circuit block diagram of the line scanner of FIG. 1a;

FIG. 4 is an enlarged plan view of a silicon photodiode chip employed in the line scanner of FIG. 1a;

Figure 1A:
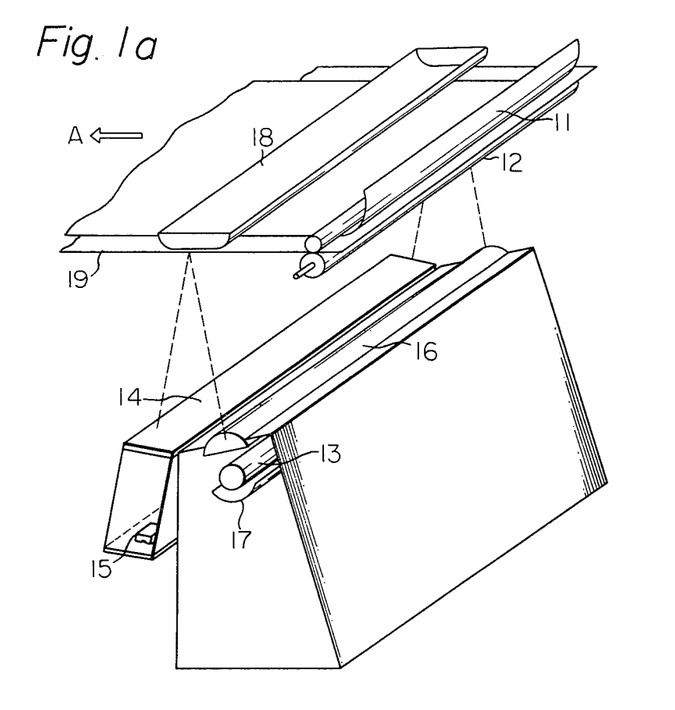
FIG. 1a is a perspective view of a facsimile line scanner applicable to the present invention.
Figure 1B:
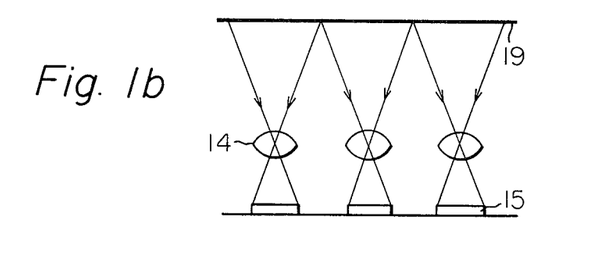
FIG. 1b is a schematic illustration of a lens system for focusing a continuous line image onto a plurality of discretely arranged photodiode chips.

A detailed explanation will be made hereinafter in connection with the accompanying drawings. FIG. 1a schematically shows the structural construction of a line scanning system to which the present invention is applicable. A typed or pictorial copy 11 is advanced in the direction of arrow A by means of a driving roller 12 and a driving control system associated therewith (not shown). The rays of light from a light source 13 irradiate the copy placed at a distance from the light source, and the reflected rays are concentrated onto each silicon chip 15 containing an array of 265 photodiodes through a plurality of focusing lenses 14. which will be described hereinbelow. A reflecting mirror 17 is provided for converging the light to avoid loss of light. That portion of the copy which is illuminated is held against a supporting plate 18 on the upper surface thereof by means of a plate 19 on the lower surface thereof made of material such as glass. The image of an entire line path is divided into sections and focussed by the plurality of lenses 14 onto corresponding silicon chips (FIG. 1b). The divided images are individually focussed on the corresponding silicon chip. It will be noted that a plurality of focussing lenses thus enables a continuous entire image to be focussed on a plurality of discretely scanned arranged photodiode chips.

Figure 2:
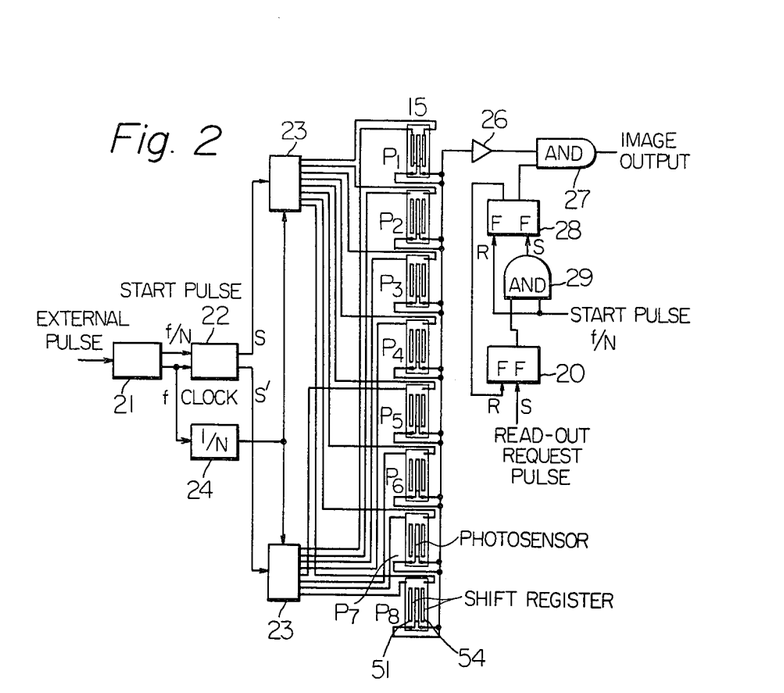
Figure 3:
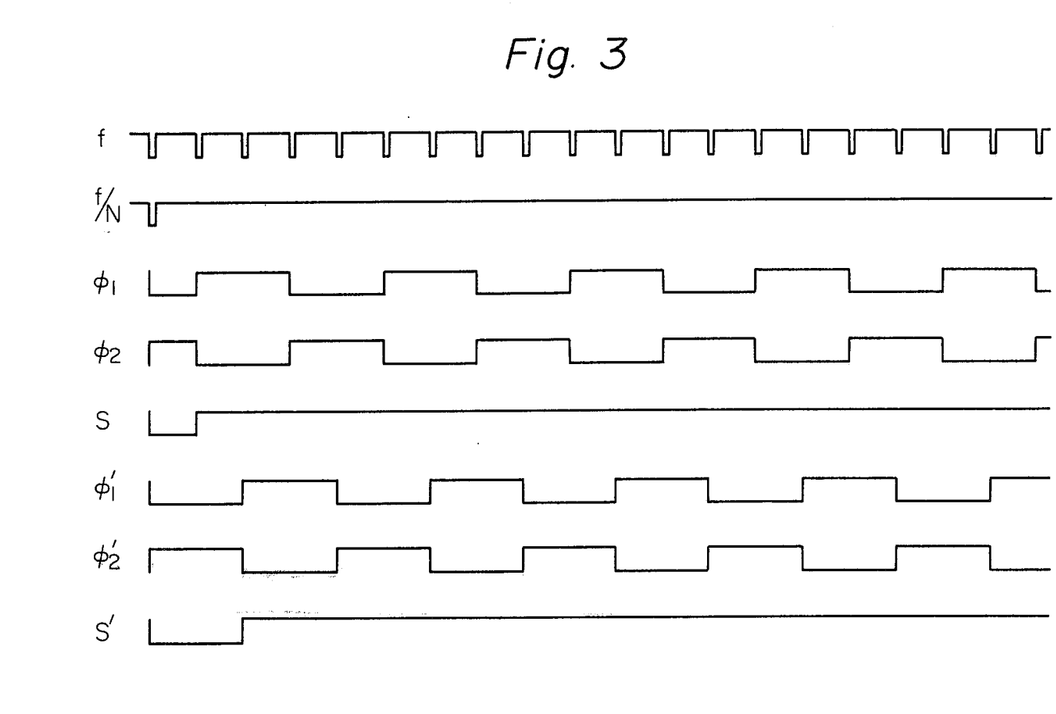
FIG. 3 shows various square waveforms employed for driving the circuitry of FIG. 2.
Figure 4:
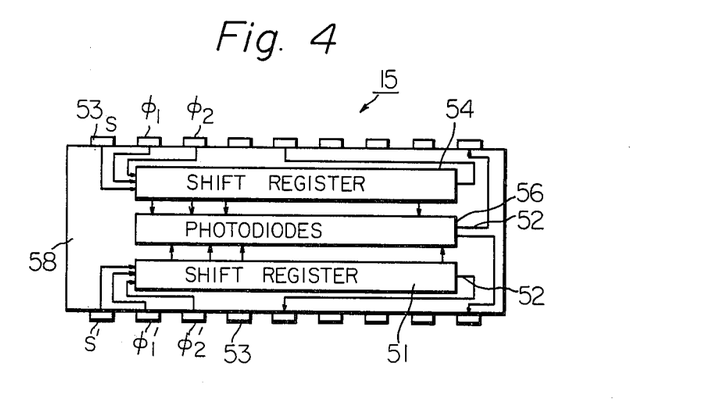

In FIG. 2, there is shown a schematic circuit diagram to which the present invention is applicable. An oscillator 21, in synchronism with an external signal, generates a clock pulse of $f$ Hz and a start pulse "P" Hz whose frequency is $1/N$ of that of the clock pulse. The clock pulse and the start pulse are supplied to a drive circuit 22 which drives the photodiode array chips 15 (in this embodiment, eight photodiode chips are employed). The drive circuit 22 may be any of the well known circuits or devices, and generates several forms of drive pulses 1, S, S', $\phi_1$, $\phi_2$, $\phi'$, and $\phi_2'$, as shown in FIG. 4. The shift registers 23 and 23' are provided, the former being supplied with the signal S derived from the drive circuit 22 and the latter being supplied with the signal S derived from the drive circuit 22 while the latter is supplied with the output signal S' of the drive circuit 22. Each of the shift registers 23 and 23' is of eight bits type, the number of the bits corresponding to that of the diode arrays. The output signals S and S' from the driving circuit 22 are shifted to drive eight pieces of the diode arrays 15, i.e., these shift registers serve as a ring counter of eight phases, respectively. It may be of course possible to employ other suitable circuit constructions. The frequency counter or divider 24 which reduces the frequency $f$ Hz is used for producing a shift pulse for the shift registers 23 and 23'. The character $n$ designates the number of picture elements per chip (In this embodiment there are 256 picture elements. Accordingly, one line is comprised of 2048 picture elements ($256 \times 8 = 2048$)).

Figure 5:
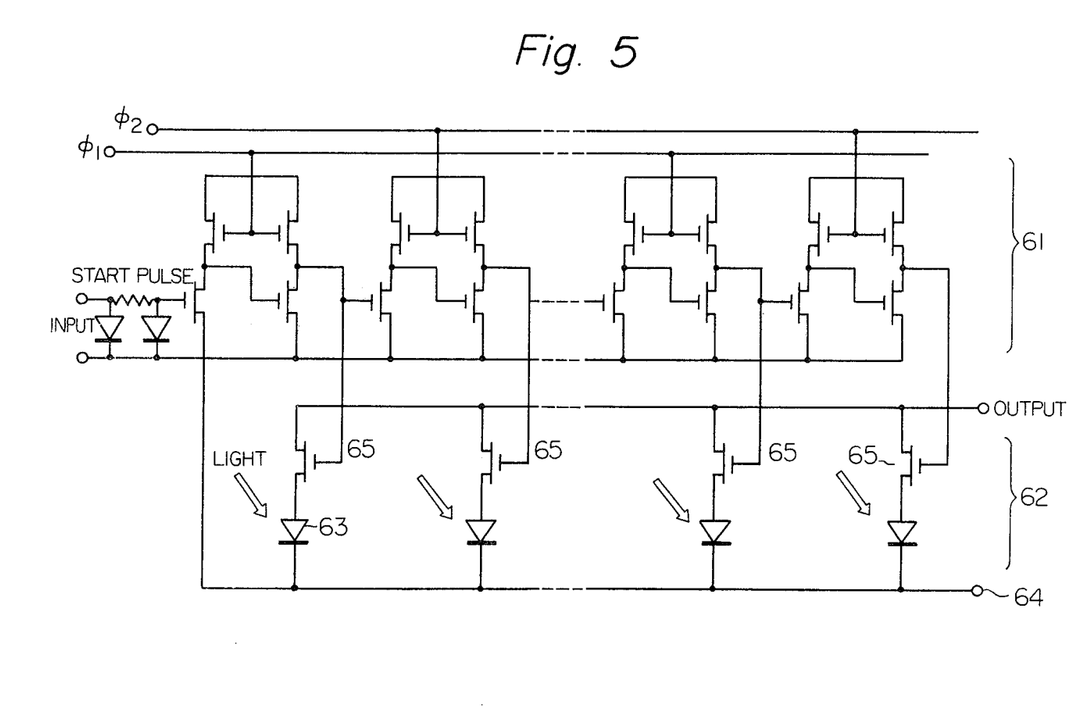
FIG. 5 is a detained circuit diagram of a shift registor and photodiodes employed in the photodiode chip of FIG. 4.

FIG. 5 shows a detailed construction of the photodiode array shown in FIG. 2. As shown in FIG. 5, the photodiode array 15 is a monolithic silicon diode array containing a row of 256 photodiodes on the narrow center portion of the silicon chip 58. The diodes are scanned by two 128 stage MOS shift registers 51 and 54 integrated onto the same silicon chip 58. Each shift registor is driven by a pair of complementary square wave clocks and a start pulse to initiate each scan as shown in FIG. 4. One shift register 54 scans the odd numbered photodiodes while the other 51 scans the even numbered ones. For this reason, four phase signals, $\phi_1$, $\phi_2$, $\phi_1'$, and $\phi_2'$ are used to scan the shift registers, and the start pulses S and S' to initiate scanning. The $\phi_1$ and $\phi_2$ are used to drive one shift register 54 and the start pulse S is used for starting it while the $\phi_1'$ and $\phi_2'$ are used for driving the other shift register 51 and the start pulse S' is used for starting it. Separate output video lines 52 are provided for the odd and even numbered elements.

Figure 6:
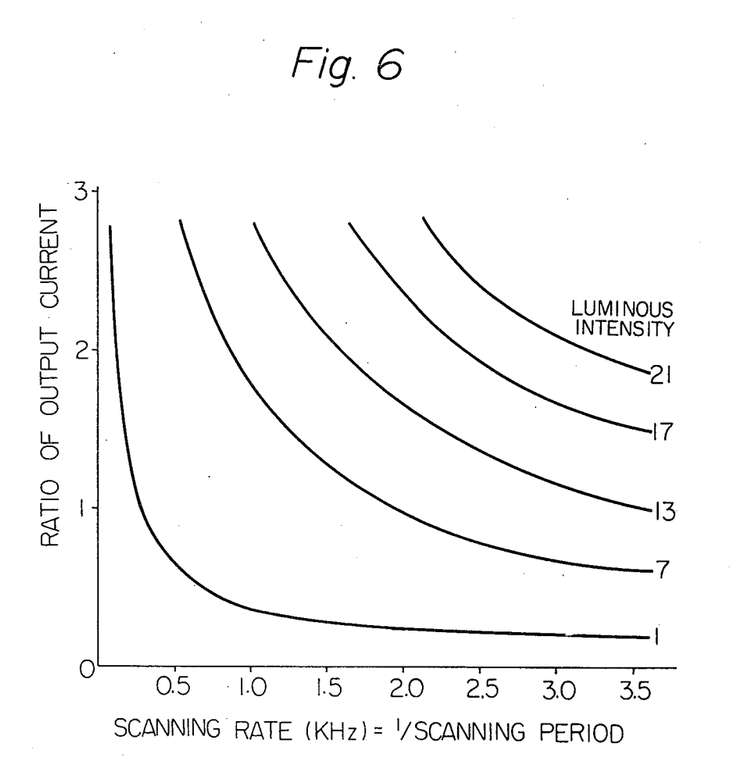
FIG. 6 is a graph illustration showing charge storage characteristic of photodiodes employed in the photodiode chip of FIG. 4.
Figure 7:
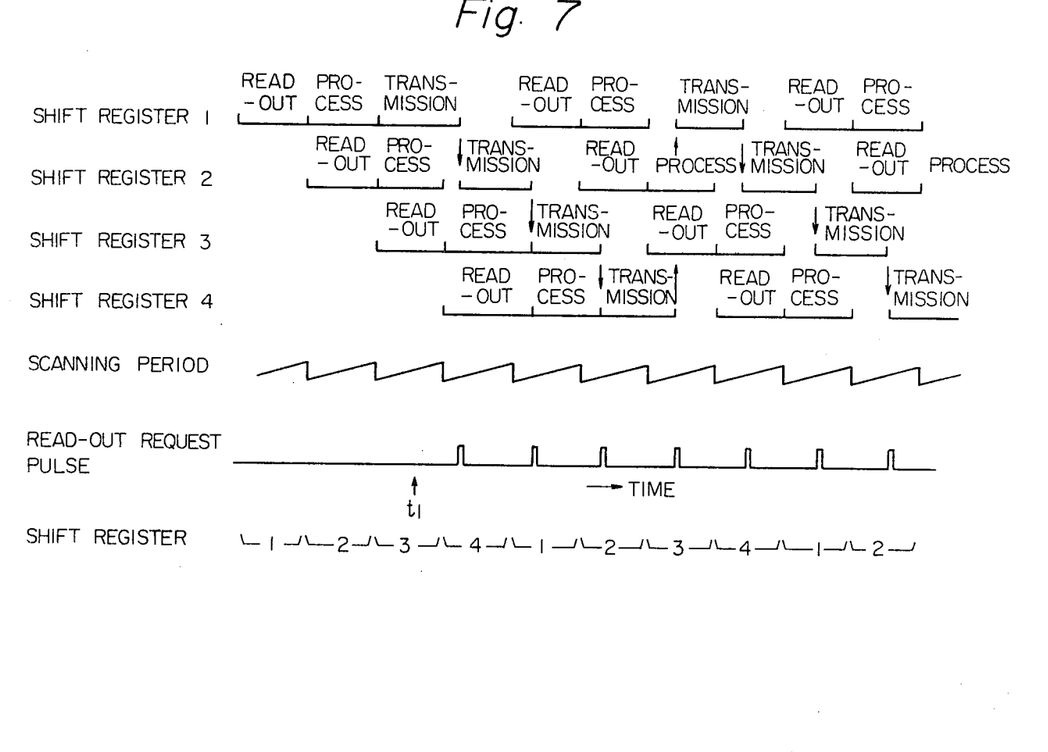
FIG. 7 is a graph showing relationship between various modes of facsimile operation in accordance with the present invention.

A detailed circuit comfiguration of the photodiode array is shown in FIG. 6, which is comprised of a shift registor 61 consisting of a plurality of shift registers and a sensor portion 62 consisting of a plurality of photodiodes 63 and field effect transistors 65. The photodiodes are operated in the charge storage mode. They integrate for an entire line time and empty their charge into an output terminal 64 as they are sampled in sequence. When the diodes are illuminated by image light, the resistance of the diodes decreases correspondingly so that charges stored in the photodiodes discharge. The amount of charges stored in the photodiodes is thus proportional to the amount of incident light flux (the time and intensity of the light). Read-out operation is performed by charging the photodiodes and the amount of the charging current represents the light intensity. It is to be noted that since the photodiodes discharges their stored energy increasingly with time, they must be scanned at a constant interval. The photodiodes are fully charged each time the readout operation is completed. The shift register 61 will charge each photodiode 63 in a sequence through corresponding field-effect transistors 65. This charging current is the read-out video signal. In FIG. 6, scanning rate versus output current relationship is shown.

In accordance with the present invention, there is provided a variable scanning method applicable to the line scanning system of FIG. 2. In FIG. 2, AND gates 27 and 29, flip-flops 20 and 28 are a pre-amplifier 26 constitute a read-out control circuit. The pre-amplifier 26 may be any of the well known type. The video output signal passing through the AND gate 27 is controlled by the flip-flops 20, 28 and 29. The photodiode chips 15 are repeatedly scanned at a repetition frequency $f/N$ Hz. It will be noted that the sampled signals are gated out only when a read-out request signal is applied to the flip-flop 20 which energizes the AND gate 29 which in turn sets the flip-flop 28 to which a start pulse $p$ is also applied. The scanning line is advanced to the next line when the video output of one line is gated out from the gate 27. Thus, the same line on the copy is repeatedly scanned regardless of whether the sampled signal is gated out or not. The read out request pulse is generated when the process of the information in the preceding line is substantially completed. The flip-flop 28 is reset each time the start pulse is applied thereto and is set only when the gate 29 is energized. When two read-out request pulses are successively applied, the flip-flop 28 is reset temporarily and then is returned to the set condition thereby enabling the sampled signals of two scanning lines to pass through the gate 27. Thus, the next line is read-out each time a read-out request pulse is applied to the read-out control circuit. The read-out request signal is generated as soon as the preceding sampled signal has been processed, and has no particular relation to the start pulse. Accordingly, one read-out operation will be made after several lines interval, another will be made immediately after the previous line has been read out.

In one aspect of the present invention, the read-out image signals from the gate 27 are placed into a plurality of memory devices on a line-by-line basis, processed and gated out sequentially on a line-by-line basis onto a transmission line, in order to achieve bandwidth compression. Generally, the information in the facsimile system is highly redundant. Thus, it is desirable to increase the speed of transmission to effectively utilize the transmission line. For carrying out the bandwidth compression, memory means are employed for storing the read-out image signal to perform the process thereof. Storage of the read-out signal neccesitates that the scanning speed is higher than that of the transmission. It is necessary, in view of cost, to use a small number of memories. On the contrary, when the number of the memories is too small, the effective utilization of the transmission line is depreciated; in case where the memory has a small capacity, subsequent read-out operation can not be made even if the process of the stored image signal in the preceding line is completed, thus resulting in a loss of transmission time. The number of the memories must be determined taking account of the two requirements mentioned above.

Assuming that one scanning line has a length of 256 mm and the number of picture elements per 1 mm is 8, the total number of the picture elements per line is 2045 or $2^{11}$ ($256 \times 8 = 2048 = 2^{11}$). When the run-length cording method may be employed for the purpose of bandwidth compression, the minimum number of run-length codes per line is comprised of 11 bits each run-length representing a sequence of black or white signals. The number of the bits required in one line is as follows: 4 bits are used to indicate whether these 11 bits are white or black, 16 bits are used for supplying the start pulse which appears at the start of each line; 1 bit for preventing a syncronous code from appearing in the video signal; another set of 16 bits used for checking errors introduced into the transmision line. Assuming a telephone line capable of transmitting information at 4,800 bauds is used (the check bits of 16 is not used in this case), the minimum transmission time of one scanning line is 32/4800 (= 1/150) seconds. If a transmission rate of 9600 bauds is used, the transmission time is 1/300 seconds. However, it is difficult to use the telephone line with 9600 bauds without the check bit. If the check bit of 16 bits is used, the total bits of one line are 48 bits so that the transmission time is 48/9600 = 1/200 seconds. The scanning period of one line must be less than that of the transmission time of a line to reduce the unavailable time occurring in the transmission time. If one shift resistor is capable of storing the sampled signal of a complete line, the number of shift registers required will be four. These four shift registers are used cyclically to store the respective sampled signals occurring on the subsequent lines as will be seen from FIG. 8. Accordingly, if the sum of the scanning time of one line and the processing time is less than that of the transmission time of one line, the number of memories may be reduced to three. According to the invention, the sampled signal is gated out in such a manner that the read-out request pulse is generated only when the memory is made available for storing the subsequent signal of a complete line. The copy is advanced stepwisely at each scanning line by means of a stepper motor each time the information of one scanning line is read out by the application of the read out request pulse. It is seen from FIG. 8 that each shift register corresponds to each subsequent scanning line at time $t_1$, a first line being for transmission, a second line being read-out a third line being processed and a fourth line being under stand-by condition.

Figure 8:
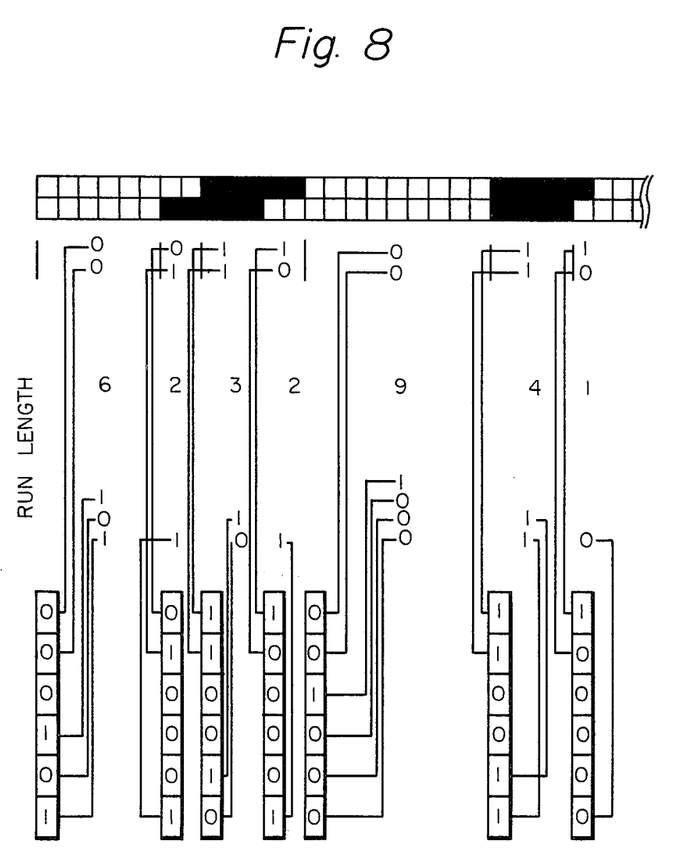
FIG. 8 is a schematic illustration showing a method for encoding a sampled signal in accordance with the present invention.
Figure 9:
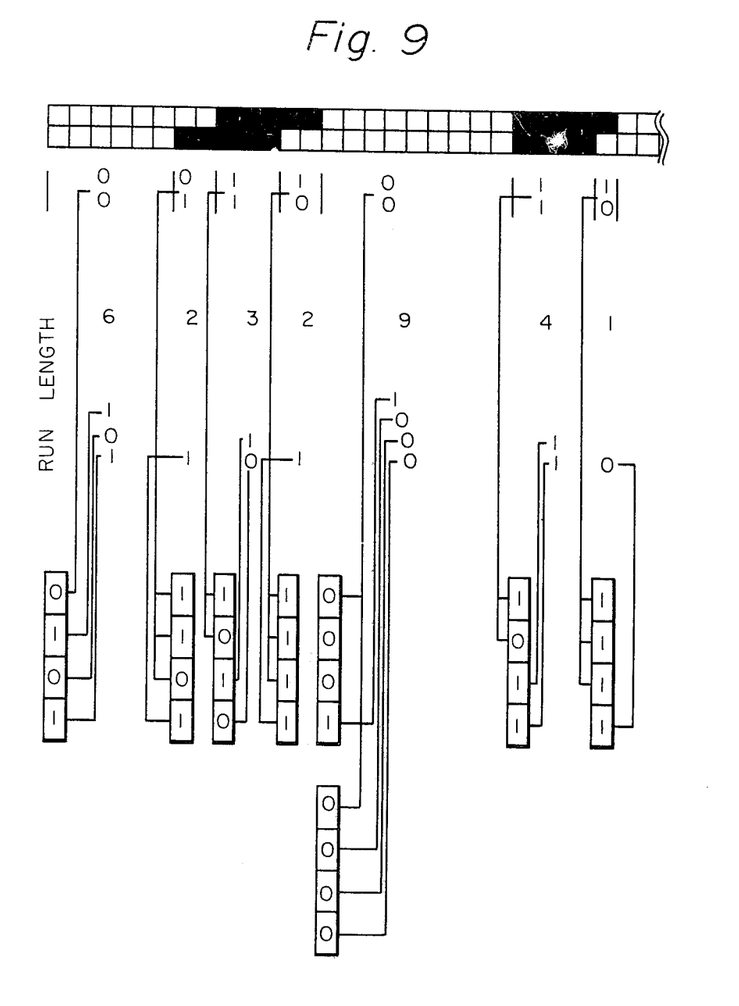
FIG. 9 is a schematic illustration showing a variation of the method of FIG. 8.
Figure 10:
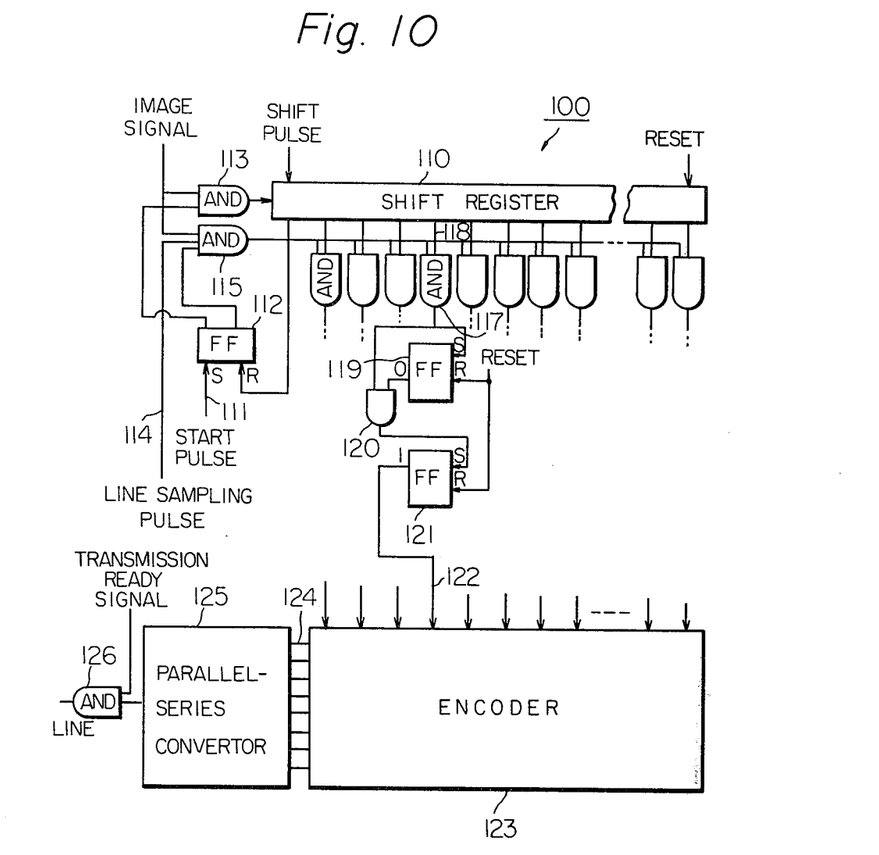
FIG. 10 is a circuit block diagram showing another embodiment of the preeent invention.

An alternative approach to the bandwidth compression is illustrated in FIGS. 9 and 10. The alternative method is a run-length coding applicable to the line scanner as described with reference to FIG. 2. In FIG. 8, two line paths of a two-valued image on a subject copy are simultaneously discretely scanned by means of a pair of parallelly arranged line scanners of FIG. 2 to produce first and second discrete signals of black or white. The simultaneously occurring discrete signals are combined to form possible combinations (in this case four combinations of black and white) of signal elements which will be further formed into successive sequence of combination runs. The kinds of combination and the length of each combination run can be encoded into binary codes suitable for transmission. In the exemplary embodiment of FIG. 8, a white-white combination run in the initial period of the scanning is represented by two bits, "00" and the length of the run (in this case, 6) is represented by three bits "101". Although six bits can be represented by "110", one bit is substracted from "110" bits since zero bit is not necessary for the run length coding. A white-black combination run is represented by "01" and its length is represented by a single bit of "1". Similarly, a black-black run is represented by "11" and its length "10", and so on. In the present embodiment, two bits are used for indicating the kind of combination runs and the reminder four bits for representing the length of each combination run. In FIG. 9, a four bit code is employed where the first bit "0" is used for representing the mode "00", the first "110" bits for the mode "01", "10" for the mode "11", and "111" for the mode "10", and the remaining bits except ones used for expressing the mode is allotted for indicating run length. If the number of bits falls short for representing a lengthy run, additional bits may be used. The mode representation of FIG. 9 is different from that of FIG. 10. The reason for this is that in the typewritten or pictorial copy, the mode "00" (white-white run) occurs most frequently, the mode "11" occurs less frequently than the former, and the modes "10" and "01" occur less frequently than the mode "11". The control signal should be encoded such that there is less likelihood of the control signal being erroneously recognized as a video signal. The control signal includes bit and word synchronizing codes, line-shift code, end-of-scan code, and error-check bits (16 bits, for example). The error-check bits are sent following a line-shift code followed by the transmission of an image signal of a complete line and then followed by a line-shift code. When an error is detected in the receiver, the complete image signal is discarded and the scan is shifted to the next line. Although the error-containing line is entirely skipped, the skipped line is not perceptible because of the narrow line width (¼ mm) and the redundancy of facsimile line scanning.

Figure 11:
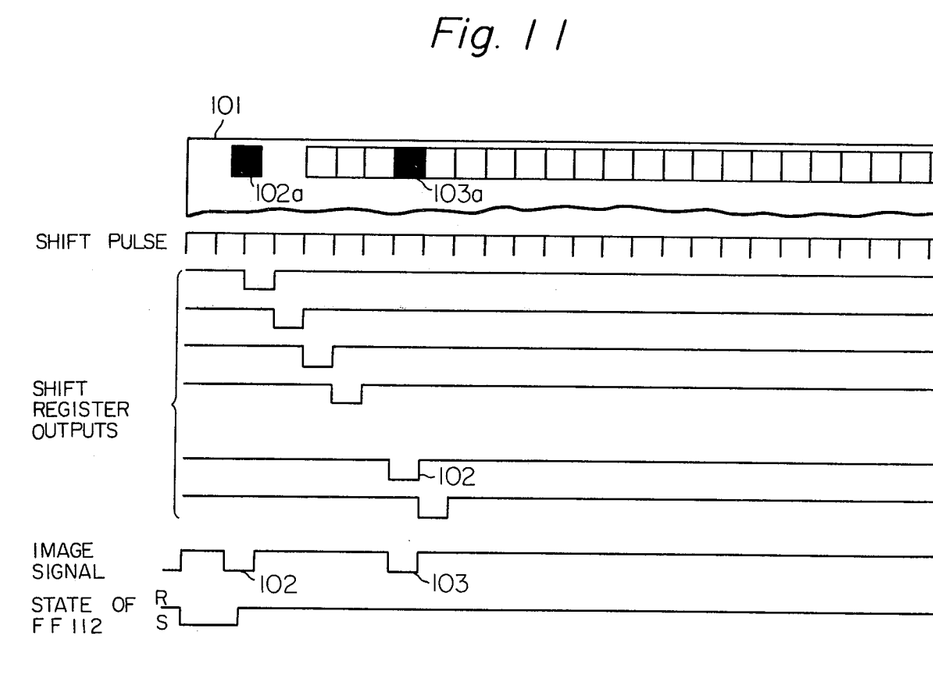
FIG. 11 illustrates relationships between various pulses and the position of destination marker employed in the practice of the FIG. 10 embodiment.

In FIG. 10, there is shown another embodiment of the present invention which automatically reads the destination information format printed in the upper marginal portion of the subject copy and generates destination code signal necessary for establishing a telephone connection to the desired destination. An automatic destination code generator in accordance with the present invention is generally indicated at reference numeral 100 and comprises a shift registor 110 to which are applied shift pulse clock occurring in synchronism with destination markers indicated in the upper marginal portion of a subject copy 101 (FIG. 11). The present embodiment contemplates the use of a format as shown in FIG. 2 to be scanned preferably by a facsimile system of the type as previously described. The format comprises a plurality of blank squares arranged in a row. The one at the leftmost position is a reference marker 102a used as an input to the shift registor 110 and shifted toward the right in a step along manner until it coincides with a destination marker 103a. The position of the blank squares thus arranged in a row indicates destination to which the subject copy is to be sent and only that portion which is filled in black indicates the allocated position of a desired destination. As the facsimile starts to scan, a start signal appears on lead 111 which sets a flip-flop 112. As the scar proceeds, an image signal, in this instance a reference marker signal 102, is generated as it scans across the reference marker 102a, energizing an AND gate 113. The reference marker pulse is thus placed in the leftmost position of the shift registor 110 and subsequently shifted toward the right in a step along manner by means of shift pulse clock which is in synchronism with the scanning rate at which the destination markers are scanned. As soon as the reference marker pulse is placed in the leftmost position, the shift registor 110 generates a rest pulse to reset the flip-flop 112 and energizes one input to an AND gate 115 by way of an amplifier 116. Simultaneously, a line sampling pulse which will be described hereinbelow is applied to lead 114. As the scan proceeds, the destination marker 103a is scanned to produce a corresponding pulse 103. This energizes the AND gate 115 which in turn energizes an AND gate 117 connected to the allocated position of the shift registor to which the reference marker signal 102 appears through lead 118. A coincidence occurs between the two pulses and the AND gate 117 is thus energized to produce an output to a flip-flop 119. It will be apparent from the foregoing that only one scanning is sufficient to determine the position of the desired destination marker. However, the scanning may preferably be repeated at least twice in order to ensure against any possible error which might be introduced into the system. Therefore, the scanning is repeated number of times determined by the line sampling pulse referred to above. Assume that the row of destination markers has a width of 4 mm and the facsimile is adapted to scan four lines per 1 mm the scanning line amounts to 16 lines. However, it is too redundant to provide all the 16 lines to ensure against possible errors, and therefore the line sampling pulse serves to reduce the number of scanning to a predetermined number, for example, 3 lines per 4 mm width. In the subsequent scanning, the AND gate 117 produces an output to the flip-flop 119. Since the flip-flop 119 has been in the state of set condition, the subsequent input pulse turns it to a reset condition, producing an output to an AND gate 120 to which the pulse from the AND gate 117 is also applied. The AND gate 120 is energized to set a flip-flop 121. An output appears on lead 122 as an input to an encoder 123 of the well known type which comprises, for example, a matrix of resistor-rectifier networks. The encoder 123, with an input applied, translates it into a destination code in the form of parallelly coded signal appearing on leads 124. It will be understood that the flip-flops 119 and 121 and the AND gate 120 constitute a two-pulse counter (which may be a three-pulse counter) and therefore, any type of pulse counter may be applicable to the present embodiment. The parallelly coded signal will then be converted by means of a parallel-series convertor 125 into a train of serially coded signals which may be sent over a transmission line to a telephone switching system which establishes a connection to the desired destination. The destination code generator 100 may further comprise a gate circuit 126 which is gated on by transmission ready signal to pass subsequent image signals to the transmission line as soon as the telephone connection has been established.

Figure 12:
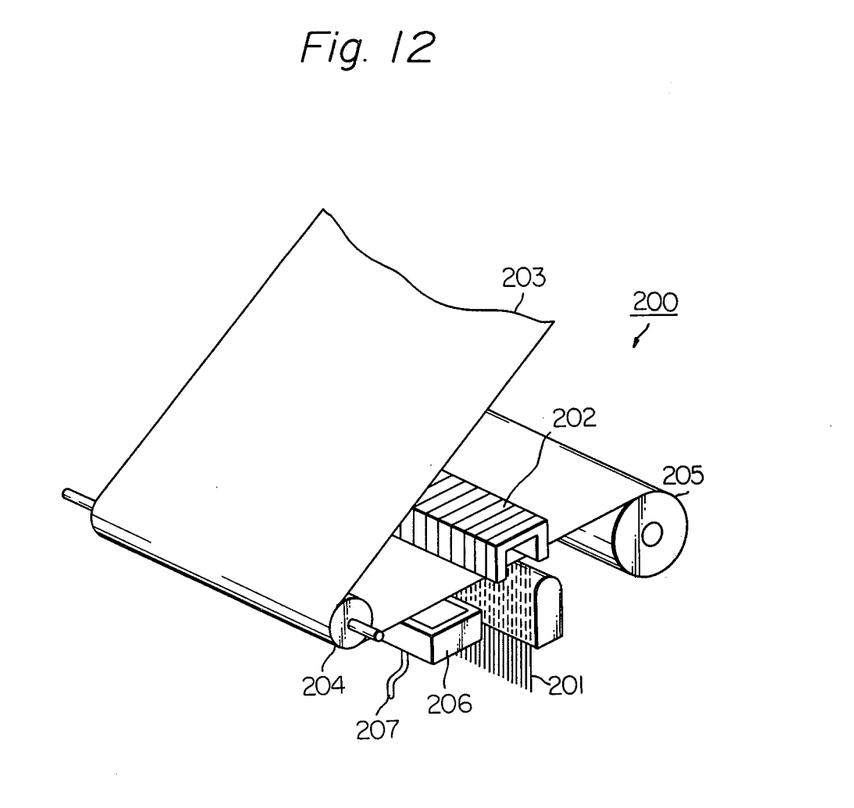
FIG. 12 is a perspective schematic view of a solid-state image recorder to which still another embodiment of the present invention is applicable.
Figure 13:
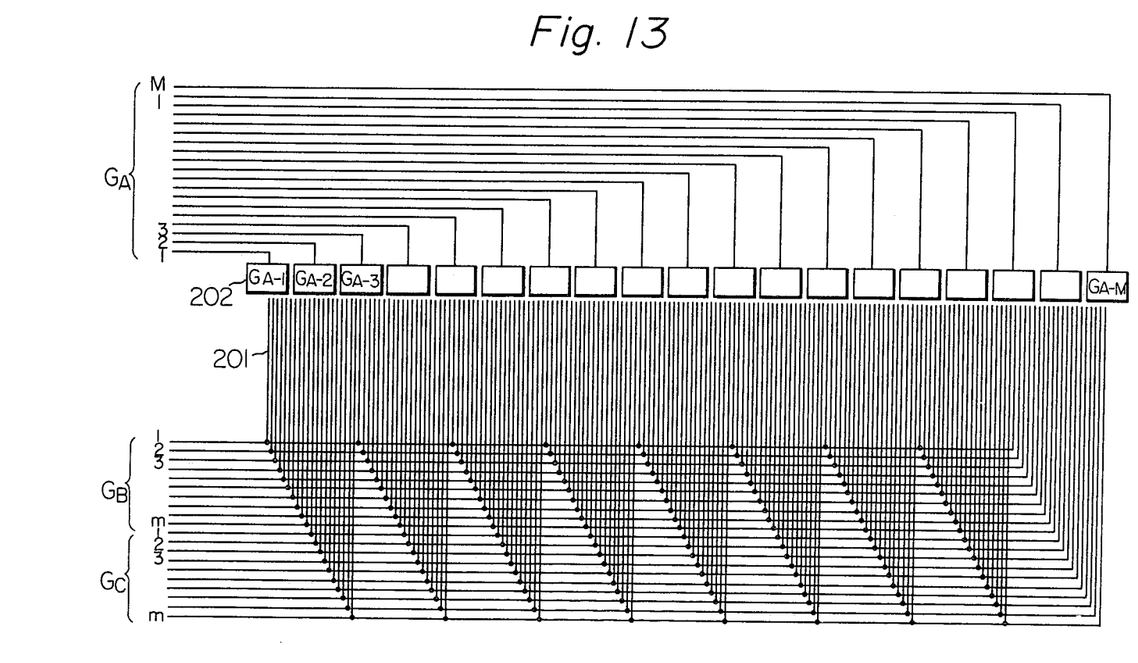
FIG. 13 illustrates an arrangement of pin electrodes and auxiliary electrode employed in the solid-state image recorder of FIG. 12.
Figure 14:
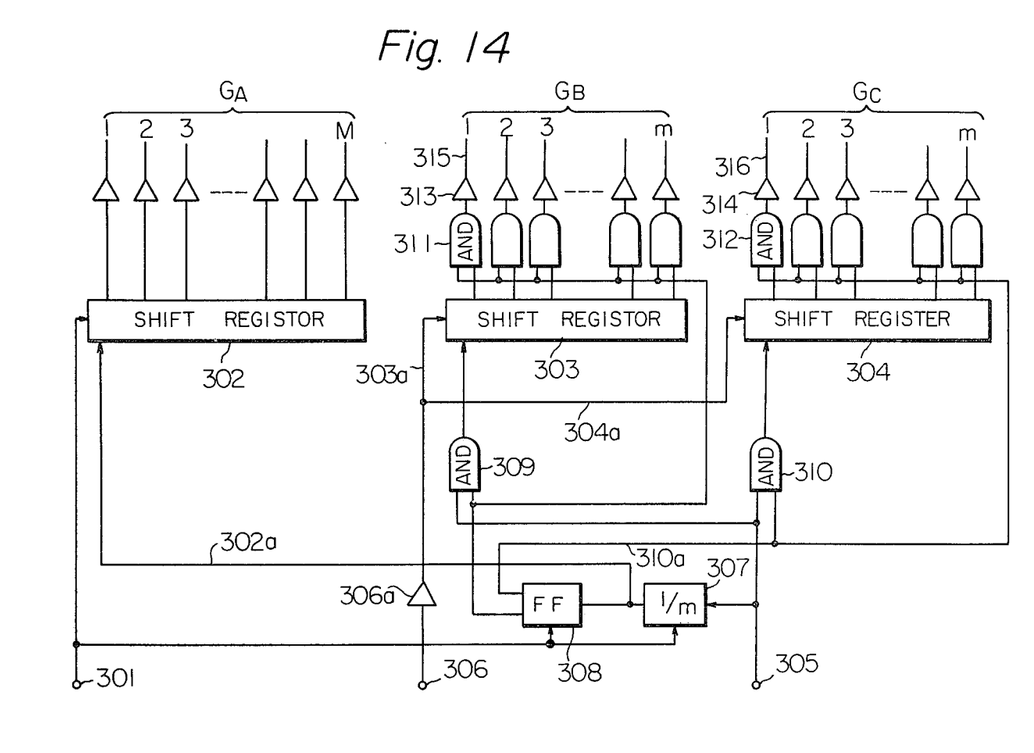
FIG. 14 is a circuit diagram used for driving the pin and auxiliary electrodes of FIG. 13.
Figure 15:
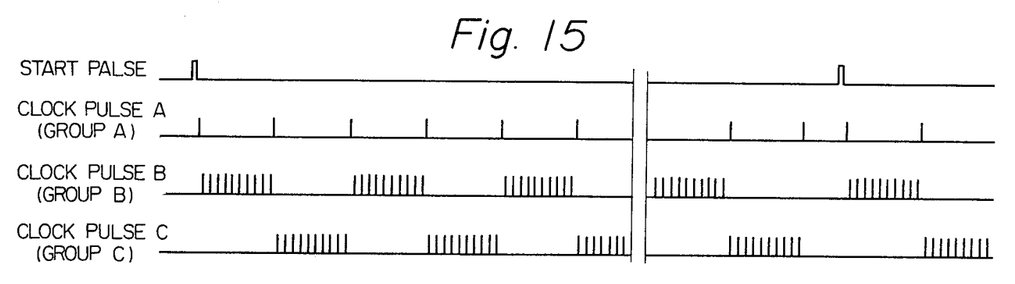
FIG. 15 illustrates relationships of various pulses appearing in the circuit of FIG. 14, when the solid-stage recorder is operated in the mode of normal scanning.

In still another embodiment of the present invention, there is provided means for selectively scanning and reproducing images on a predetermined basis by skipping unnecessary portions thereof to achieve compression of the transmission time. In FIG. 12 there is shown an example of a solid-state electronic image recording apparatus 200 which comprises a plurality of pin electrodes, each corresponding to a picture element, arranged along the direction of line scanning and auxiliary electrodes 202 arranged in opposed relationship therewith. A recording roll of paper 203 is interposed between the two electrodes and transported by means of a driving roller 204 and a feeding roller 205 in a direction perpendicular to the direction of line scanning. The auxiliary electrodes 202 are connected to input terminals designated Group A (FIG. 13) and the pin electrodes 201 are equally divided into two groups of terminals Group B and Group C each having $m$ terminals. If pulses are applied in a predetermined sequential manner to these electrodes, a latent image will be formed on the recording paper and a visible image will be developed when the paper is moved past a developer 206 which contains an image-forming toner supplied through the inlet 207. An example of circuit arrangements for carrying out the application of sequential pulses is shown in FIG. 14. Firstly, a start signal which occurs at each line scan is given to a start signal input terminal 301 to clear the contents, if any, in a frequency divider 307 and a flip-flop 308 and also given to the leftmost position of a shift register 302. In one aspect of the present invention, the auxiliary electrodes 202 are arranged such that any adjacent electrode elements (e.g. $G_{A-1}$ and $G_{A-2}$) are simultaneously energized to set up a uniform electrical field over the substantial portion of the two electrodes, and the pin electrodes 201 are arranged such that each of the Groups A and B starts from the central portion of an auxiliary electrode (e.g. $G_{A-1}$) and ends at the central portion of the adjacent auxiliary electrode (e.g. $G_{A-2}$). Otherwise, individual application of pulses to the auxiliary electrodes would cause the transitional portions of the auxiliary electrodes to produce varying electric field. An image signal when applied to an image-input terminal 306 is placed into the leftmost position of shift registors 303 and 304 through leads 303$a$ and 304$a$ after amplification by an amplifier 306$a$. A train of clock pulses having a repetition frequency f are applied to a clock-pulse input terminal 305, has its frequency divided into a submultiple $m$ in the frequency divider 307 whose output sets the flip-flop 308. Thus, an AND gate 309 is energized to produce an output to the shift register 303 when a subsequent clock pulse is applied to the clock-input terminal 305 causing the stored bit to be shifted one step to the adjacent bit position. Simultaneously, the output from the frequency divider is also applied to the shift register 302 through lead 302$a$ to move the start pulse to the next bit position and energize the terminals 1 and 2 of the Group A, or the auxiliary electrodes 202 ($G_{A-1}$, $G_{A-2}$). The clock pulses appearing on the terminal 305 are also applied to the AND gates 309 and 310 and energize the AND gate 309 to produce an output to the shift register 303, causing it to shift the stored bit to the first bit position. Thus, an AND gate 311 is energized to produce an output which is amplified at an amplifier 313 and delivered to the terminal 1 of the Group B electrodes ($G_{B-1}$). Since the flip-flop 308 remains in the set condition until the $m$ the clock pulse is counted in the frequency divider or counter 307, the subsequent clock pulses cause the AND gate 309 to produce corresponding output pulses and thus cause the shift register 303 to shift its content to the adjacent position. After the $m$ th clock pulse has been counted, the frequency counter produces another pulse which resets the flip-flop 308 and energizes lead 310$a$. In the next cycle of the subsequent $m$ clock pulses, an AND gate 310 will be caused to produce output pulses which in turn cause the shift register 304 to shift its content to the adjacent position. Thus, the image signal appears on terminal 316. Therefore, it will be apparent from the foregoing that the shift registers 303 and 304 are energized alternately and a sequence of tiny dots will be produced on the recording paper as the stored bit in the shift register 302 is sequentially emptied therefrom. In the foregoing description, the image signal is delivered to the opposed electrodes 201 and 202 by means of clock pulses occurring at a predetermined fixed intervals as shown in FIG. 15.

Figure 16:
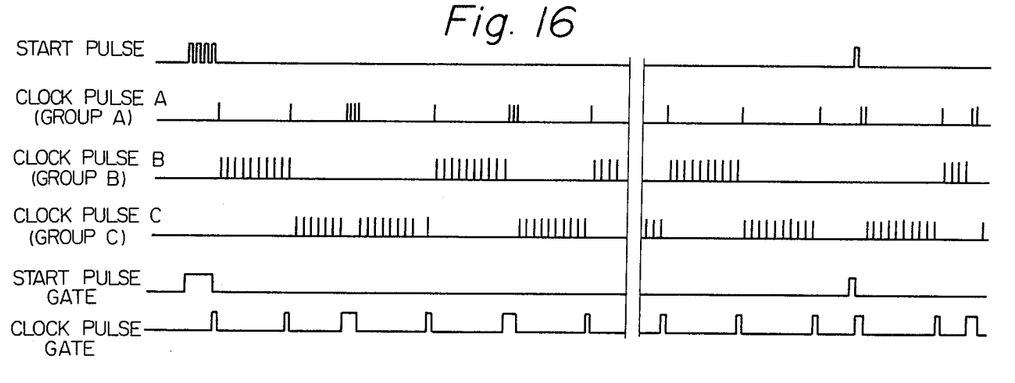
FIG. 16 illustrates relationships of various pulses appearing in the circuit of FIG. 14, when the solid-stage recorder is operated in the mode of pragrammed scanning in accordance with the present invention.

In accordance with another aspect of the invention, means for compressing transmission time is achieved by causing scanner to selectively scan predetermined portions of a subject copy. Since every subject copy contains blank spaces while bears no information, these blank spaces can be skipped to reduce the amount of information to be transmitted. If scanning is made on a programmed basis at opposite ends of a transmission line, only predetermined portions of a subject copy can be transmitted. The programmed scanning at opposite ends of a line can be performed by retrieving gate signals respectively for the start and clock signals from a storage device such as a computer memory. These gate signals are in the form of pulses as shown in FIG. 16 which serve to gate the start pulses and clock pulse A, respectively. If a blank space occurs entirely along a plurality of complete lines, the start gate pulse gates a plurality of start pulses (which equals to the number of complete blank lines) in a rapid succession so that the corresponding lines may be skipped. If a blank space occurs halfway in a scanning line, the clock gate signal gates a plurality of clock pulses A in a rapid succession to skip a plurality of auxiliary electrodes. The opposite ends of the system are required to start operation so that the start signals are brought into coincidence at the initial start. Programming can also be possible by recording necessary programmed information in the form of the position and time, or may be in the form of numerals indicating the pulse intervals. The number of auxiliary electrodes may be recorded for carrying out the line skipping.

In actual application of the present invention, coding transmission and image transmission can be possible over a single transmission line. For example, letters, symbols and numerals can be transmitted in the form of coded signals and reconstructed at the receiving end of the line using a character generator or pattern generator, while complex image will be transmitted directly. These different modes of transmission can be effected on a programmed basis as previously described.

What is claimed is:

1. A method for scanning an image on a subject copy using an array of charge storage type photosensors of a facsimile transmitter, comprising the steps of: driving said array of photosensors in a sequence at a predetermined constant speed repeatedly along a single line path to produce a video signal; gating out said video signal onto a transmission means when said transmission means is ready for transmission; and shifting said subject copy to a subsequent line when said video signal has been gated out.

2. An apparatus for scanning an image on a subject copy in a given direction comprising: a light source for illuminating said subject copy, a plurality of N arrays of $n$ photosensors for each array, means for focussing light rays modulated by said image onto said arrays of photosensors, means for shifting said subject copy in a direction perpendicular to said given direction, means for producing clock pulses having a repetition frequency $f$ to drive said photosensors, means for producing a first train of pulses having a repetition frequency $f/N$, means for producing a second train of pulses having a repetition frequency $f/n$, and a shift register.

3. A method for scanning an image on a subject copy in a given direction, comprising the steps of:
applying a start pulse to an array of photosensors, said start pulse having a predetermined constant retetition rate to produce video signals;
applying said video signals to a gate circuit;
gating out said video signals only when a read-out request pulse is applied to said gate circuit;
applying a read-out request pulse to said gate circuit; and
shifting said subject copy in a direction perpendicular to said given direction by the width of a line when said video signals are gated out.

* * * * *